United States Patent [19]
Ostrander et al.

[11] Patent Number: 5,882,047
[45] Date of Patent: Mar. 16, 1999

[54] QUICK CONNECTOR FLUID COUPLING

[75] Inventors: James E. Ostrander, Rochester; Richard Pender, Oakland; Gary O. Klinger, Warren, all of Mich.

[73] Assignee: ITT Automotive, Inc., Auburn Hills, Mich.

[21] Appl. No.: 771,239

[22] Filed: Dec. 20, 1996

[51] Int. Cl.⁶ ...................................................... F16L 37/04
[52] U.S. Cl. ........................... 285/319; 285/921; 285/242
[58] Field of Search .................................... 285/319, 921, 285/136.1, 139.1, 139.3, 140.1, 383, 148.1, 148.14, 258

[56] References Cited

U.S. PATENT DOCUMENTS

| | | |
|---|---|---|
| 3,964,339 | 6/1976 | Antonio et al. ...................... 285/921 X |
| 4,026,581 | 5/1977 | Pasbrig . |
| 4,123,091 | 10/1978 | Cosentino et al. . |
| 4,451,069 | 5/1984 | Melone . |
| 4,471,978 | 9/1984 | Kramer . |
| 4,577,894 | 3/1986 | Wake . |
| 4,673,200 | 6/1987 | Miyauchi . |
| 4,790,569 | 12/1988 | Chaffee . |
| 4,820,288 | 4/1989 | Isono ..................................... 285/148.1 |
| 4,826,477 | 5/1989 | Adams . |
| 4,969,879 | 11/1990 | Lichte . |
| 5,082,315 | 1/1992 | Sauer . |
| 5,366,256 | 11/1994 | Pruzin .............................. 285/140.1 X |
| 5,374,088 | 12/1994 | Moretti et al. . |
| 5,462,313 | 10/1995 | Rea et al. . |
| 5,511,827 | 4/1996 | Steinkamp et al. . |
| 5,524,939 | 6/1996 | Bartholomew . |
| 5,544,923 | 8/1996 | Bartholomew . |
| 5,568,946 | 10/1996 | Jackowski ........................... 285/319 X |
| 5,568,948 | 10/1996 | Bartholomew . |
| 5,573,279 | 11/1996 | Rea et al. . |

*Primary Examiner*—Anthony Knight
*Assistant Examiner*—Gary Grafel
*Attorney, Agent, or Firm*—Thomas N. Twomey

[57] ABSTRACT

A fluid conduit quick connector includes first and second releasably connectable bodies. A tapered bore in the first body receives one end of a first conduit. A tubular extension projecting from one end of the second body is coaxially received in the conduit when the first and second bodies are releasably joined together. The conduit is sealingly compressed between the tapered bore and one or more projections on the extension. A third body carries another conduit and is releasibly connected to the second body. The third body also includes mounting members to fixedly mount the third body to a support.

13 Claims, 4 Drawing Sheets

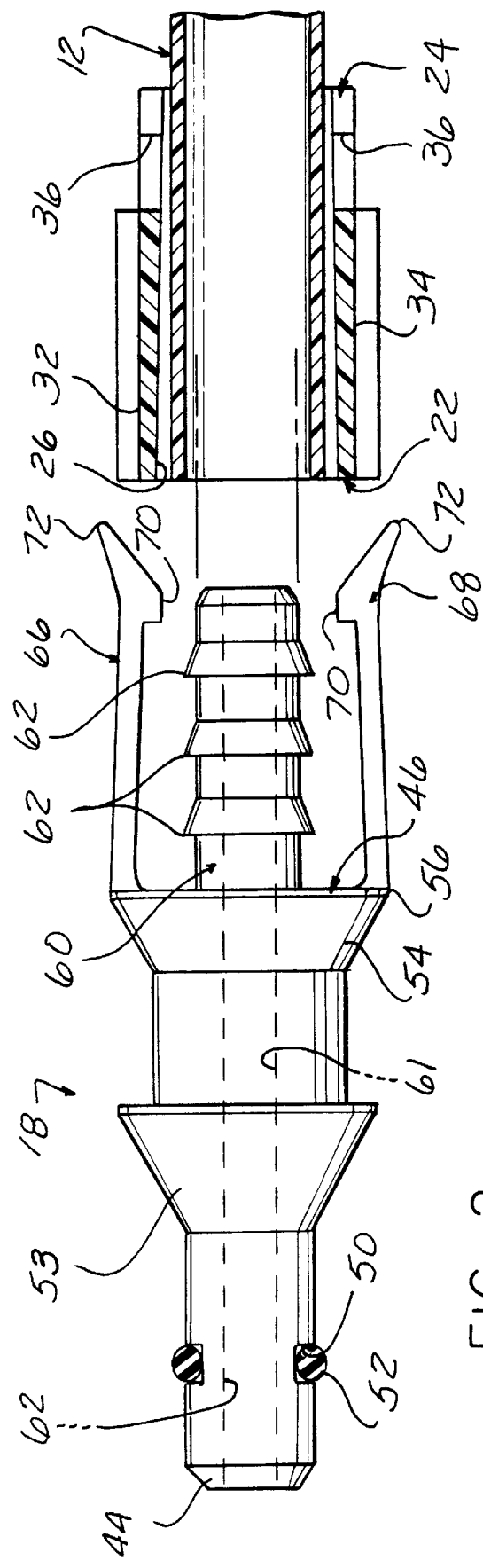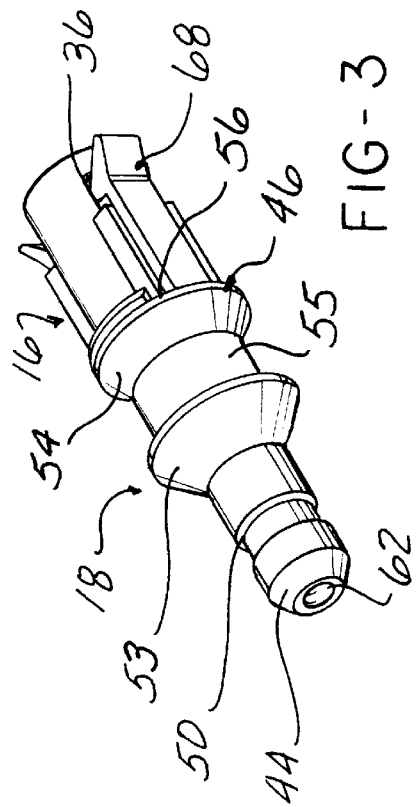

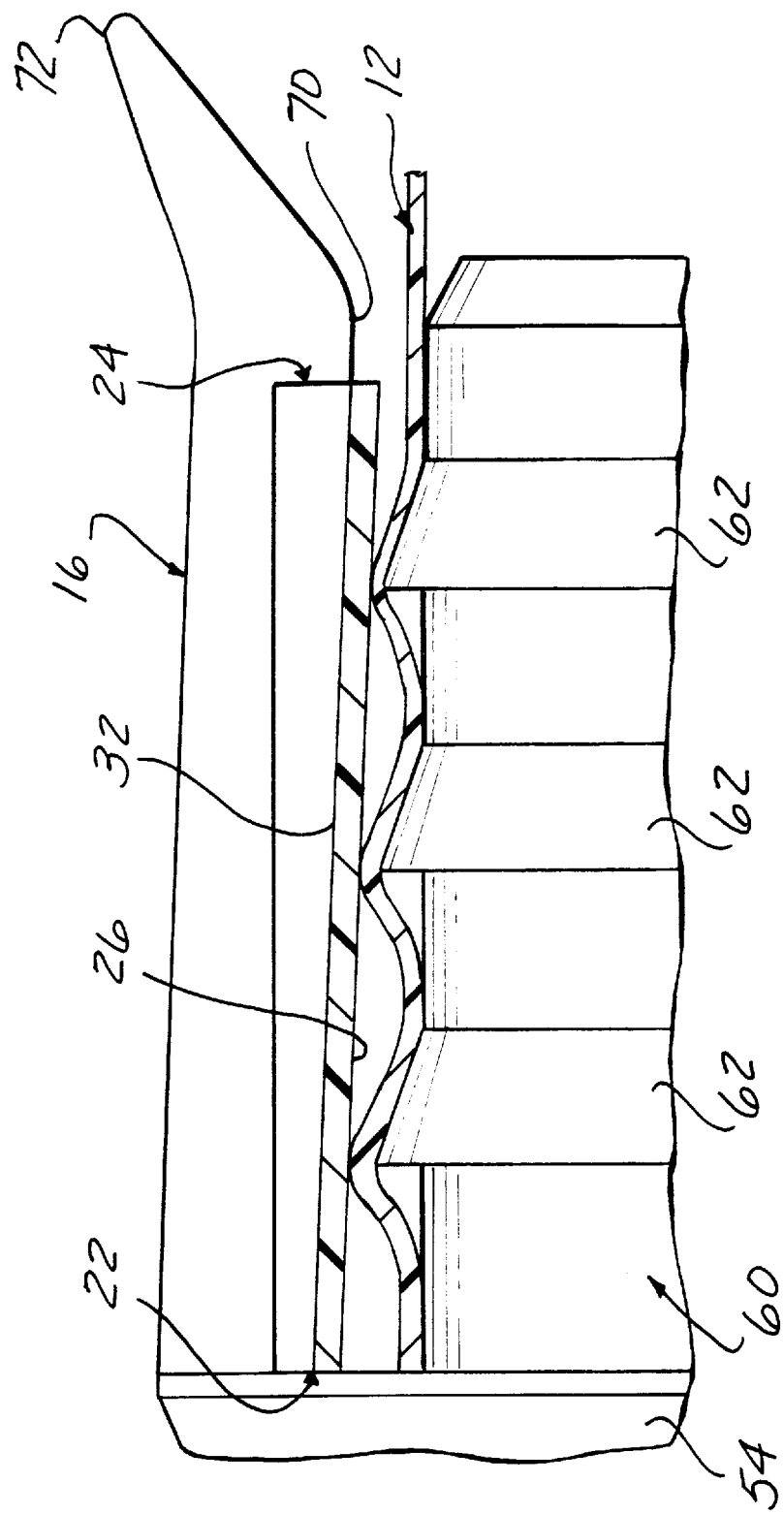

QUICK CONNECTOR FLUID COUPLING

BACKGROUND OF THE INVENTION

1. Field of the Invention

The present invention relates, in general, to fluid couplings, and more specifically, to quick connector type fluid couplings.

2. Description of the Art

Connectors are used to interconnect two fluid conduits or hoses in a fluid delivery system. In particular, connectors are used in the windshield wiper/washer system of an automobile to interconnect various portions of the washer fluid delivery system on the vehicle. This is necessary due to the manufacture of different components of the wiper/washer system at different times and/or by different manufacturers.

One part of the wiper/washer system includes a conduit extending from a fluid supply reservoir to a connector fixedly mounted at or adjacent to the vehicle cowl screen. A second conduit or hose is mounted in each windshield wiper and must be connected to the connector on the vehicle cowl screen. Typically, such interconnection is done by an installer who manually urges the end of each wiper mounted conduit or hose onto the connector mounted on the vehicle cowl.

However, the conduits or hoses employed in windshield wiper/washer systems have extremely small diameters and are typically extremely flexible. Due to the small diameter of conduit and the small size and diameter of the connector, it is difficult for an installer to fully urge one end of wiper mounted conduit onto the connector to form a sealed, fixed connection between the wiper mounted conduit and the connector. The installer further lacks any feedback as to whether the conduit has been fully sealingly coupled to the connector. As a result, a large number of leaks occur in vehicle wiper/washer systems due to a non-fully seated hose/connector joint.

Thus, it would be desirable to provide a quick connect fluid coupling which can be advantageously employed in a vehicle windshield wiper/washer system to overcome the deficiencies encountered in previous fluid couplings used in vehicle wiper/washer systems. It would also be desirable to provide a quick connector fluid coupling which provides a more ergonomical assembly to insure a fully sealed fluid joint. It would also be desirable to provide such a quick connect fluid coupling which has a low insertion force to insure a fully sealed coupling as well as providing a positive indication of a fully sealed fluid coupling to the installer.

SUMMARY OF THE INVENTION

The present invention is a fluid coupling which includes first, second and third connector bodies. The first body has an axial through bore extending between opposed first and second ends. A first conduit is disposed in the bore. The bore tapers inward from a larger diameter at the first end of the first body to a smaller diameter in the first body.

The second body also has an axial bore extending between opposed first and second ends. An extension protrudes axially from the second end of the second body. An axial bore extends through the second body and the extension for fluid communication with the first conduit and the bore in the first body when the first and second bodies are joined together.

Means are carried on the first and second bodies for releasably connecting the first and second bodies together. The projection and the tapering diameter of the bore in the first body forcibly squeeze the first conduit between the projection and the tapering bore.

The third body also has an axial bore extending between opposed first and second ends. A second conduit is disposed in the bore in the third body. Means are carried on the second and third bodies for releasably joining the second and third bodies together to form a fluid flow path between the first and second conduits through the joined first, second and third bodies.

In a preferred embodiment, a plurality of axially spaced, annular projections are formed on the extension of the second body. The connecting means comprises at least one and preferably a pair of latch arms extending from the second end of the second body, and receiver means carried in the first body for releasably receiving the latch arm(s). Preferably, the receiver means comprises at least one aperture formed in the first body.

In a preferred embodiment, the first and second latch arms extend generally axially from the second end of the second body to spaced tips. Preferably, the first and second latch arms extend angularly inward toward each other with respect to a longitudinal axis through the second body to provide increased spring force for a more secure connection having a high pull out force when the first and second bodies are joined together.

The means for connecting the second and third bodies preferably includes a conical portion formed on the second body, the conical portion having a peripheral edge. A pair of arms extend from the third body and have an aperture formed therein. An inward extending projection is formed on each arm adjacent to one edge of each aperture to releasably engage the peripheral edge of the conical portion of the second body to releasably connect the second and third bodies together.

Means are also provided for fixedly mounting the third body to a support structure such as a vehicle cowl, for example. Preferably, the mounting means comprises a pair of resiliently extending arms which releasably engage an aperture in the support after the third body in inserted through the aperture.

In another embodiment, the first and second connector bodies can be used by themselves to form a fluid coupling between two conduits. In this embodiment, the first and second bodies are formed as substantially described above, with the second body having means for forming a connection to a conduit rather than being configured for insertion into the third body.

The quick connector fluid coupling of the present invention provides significant advantages over previously devised quick connector fluid couplings which provides a more ergonomical assembly of two fluid carrying members, such as a fluid conduit and a fluid connector mounted at one end of another conduit. The present quick connector fluid coupler also has a low insertion force which more readily insures full sealing of one fluid component in the other fluid component. Finally, the quick connector fluid coupling of the present invention provides a positive latched indication to the installer which indicates that the two fluid components are fully and securely joined together.

BRIEF DESCRIPTION OF THE DRAWINGS

The various features, advantages and other uses of the present invention will become more apparent by referring to the following detailed description and drawing in which:

FIG. 2 is an exploded, cross sectional view of the first and second bodies of the quick connect of the present invention shown in FIG. 1;

FIG. 3 is a perspective view of the assemblied first and second bodies shown in FIG. 2;

FIG. 6 is partial, enlarged, longitudinal, cross sectional view of the assembled quick connector of the present invention.

DESCRIPTION OF THE PREFERRED EMBODIMENT

Figure 1:
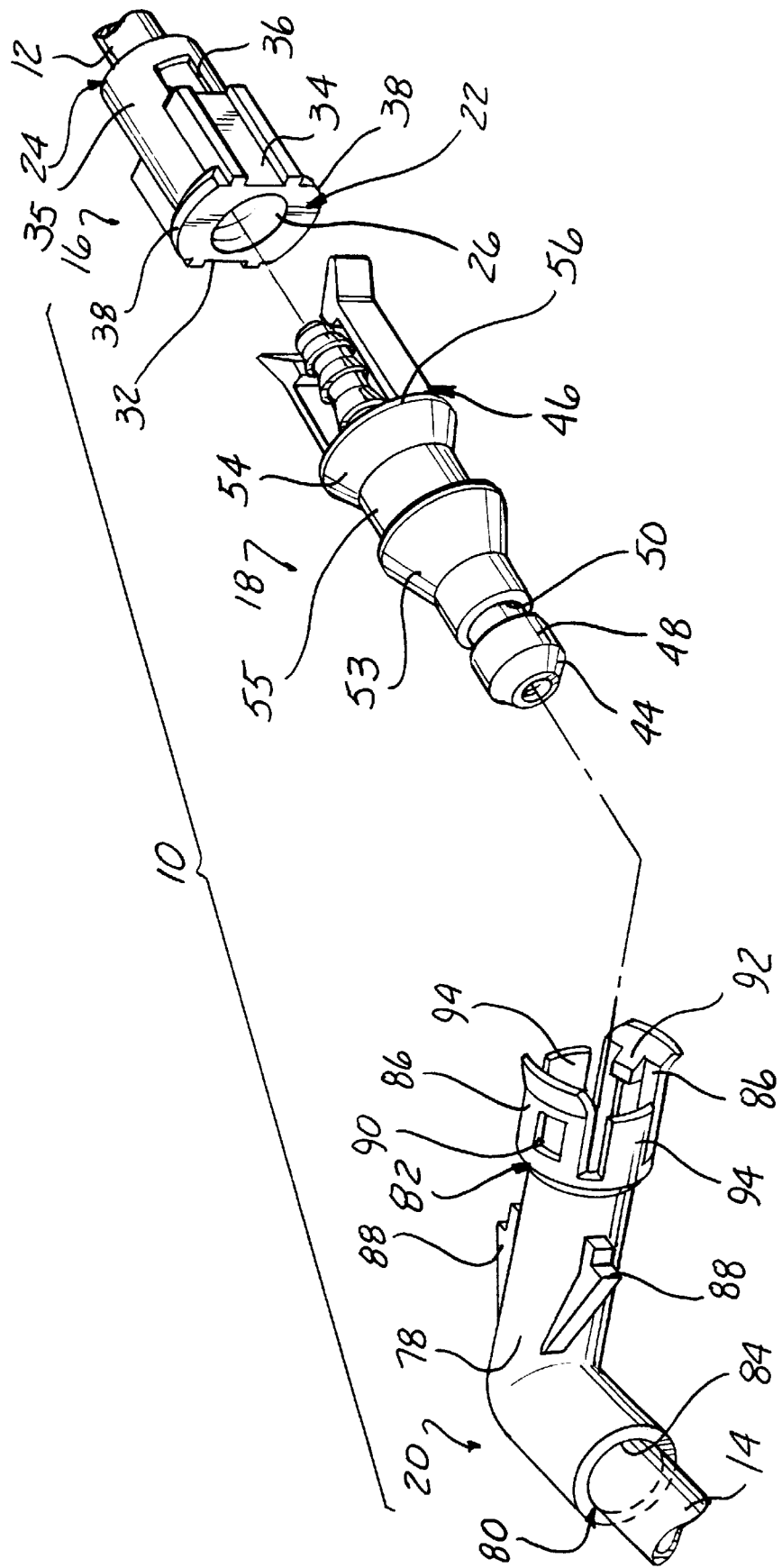
FIG. 1 is an exploded prospective of the quick connector fluid coupling of the present invention.

Referring now to FIGS. 1–4, there is depicted a quick connector fluid coupling 10 which sealingly interconnects first and second fluid conduits 12 and 14, respectively. The first and second fluid conduits 12 and 14 may be any conventional fluid carrying member, such as a plastic or rubber conduit, hose, etc.

In a preferred embodiment, the fluid coupling 10 includes first and second releasibly and sealingly interconnectable bodies 16 and 18, respectively, as well as a third connector body 20 which is releasably and sealingly connectable to the second body 18.

As shown in FIGS. 1–4 the first body 16 is formed of a suitable plastic, such as Nylon 6 and has a generally cylindrical configuration extending between opposed first and second ends 22 and 24, respectively. An axially extending bore denoted generally by reference number 26 extends from the first end 22 to the second end 24.

As shown in FIG. 2, the bore 26 is preferably formed with an inwardly extending taper which extends from a large diameter at the first end 22 of the first body 16 to a smaller diameter at the second end 24.

Recesses 32 and 34 are formed on opposite sides of the first body 16 for receiving latch arms, described hereafter, formed on the second body 16. A pair of apertures 36, one of which is shown in FIG. 1, are formed in a cylindrical end 35 and form part of a latch arm receiver means, as described hereafter. Finally, a pair of opposed radially outwardly extending flanges 38 are formed at the first end 22 of the first body 16.

The second body 18 is formed of a suitable plastic material, such as Nylon 6. The second body 18 has opposed first and second ends 44 and 46, respectively. A generally cylindrical, tubular portion 48 extends from the first end 44 and includes an annular recess 50 sized to receive a seal means, such an O-ring 52, as shown in FIG. 2. The first cylindrical portion 48 merges into an enlarged, frusto-conical portion 53. A tubular shaft 55 extends from the frusto-conical portion 53 to another frusto-conical portion 54 which has an outer peripheral edge 56 at the second end 46 of the second body 18.

A generally cylindrical extension 60 projects from the second end 46 of the second body 18 and has an internal bore axially aligned with respect to a similar bore 61 extending through the second body 18. At least one, and preferably, a plurality of radially enlarged projections 62 are formed externally on the extension 60. Preferably, the projections 62 comprise annular, radially outward extending projections as shown in FIG. 2.

Latch means preferably in the form of a pair of opposed latch arms 66 and 68 are formed on the second body 18 and project generally axially from the second end 46 of the second body 18. The latch arms 66 and 68 have a generally concave shape with an inwardly extending tab 70 adjacent an outer end 72. The outer end 72 extends radially outward from a longitudinal axis of the second body 18 from the tab 70. The tabs 70 are positioned to engage the apertures 36 in the first body 16 when the first and second bodies 16 and 18 are joined together. During such insertion, the latch arms 66 and 68 slide along the recesses 32 and 34 in the first body 16 until the tabs 70 snap into the apertures 36. The outer end 72 of the latch arms 66 and 68 may be urged outward by manual force or by means of a suitable release tool to disengage the tabs 70 from the apertures 36 so as to enable separation of the first and second bodies 16 and 18.

During such interconnection of the first and second bodies 16 and 18, the tapering bore 26 in the first body 16 coacts with the projections 62 on the cylindrical extension 60 on the second body 18 to forcibly squeeze an end portion of the first conduit 12 situated therebetween as shown in FIG. 6. This creates a secure, sealed connection of the conduit 12 to the extension 60 which has a high pull out resistance.

Figure 4:
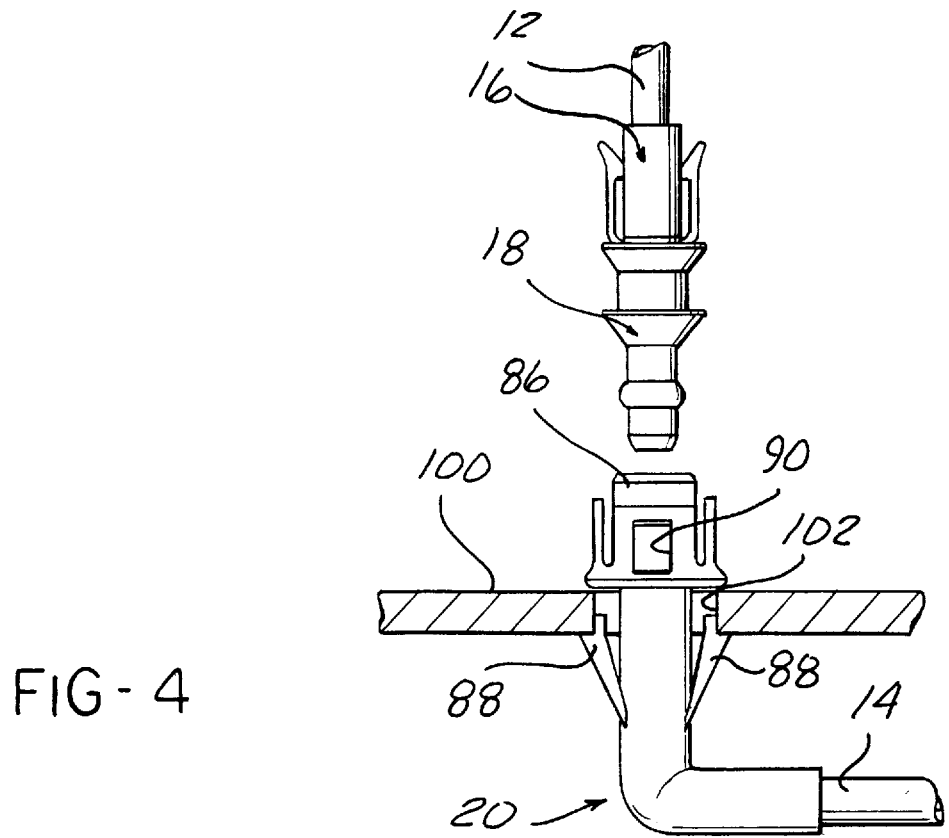
FIG. 4 is a partially cross sectioned exploded view showing the assembly of the first and second bodies in the third body.

As shown in FIGS. 1 and 4, the third body 20 includes a generally cylindrical portion 78 with opposed first and second ends 80 and 82, respectively. A bore 84 extends through the cylindrical portion 78 between the first and second ends 80 and 82. By example only, the cylindrical portion 78 is shown as being in the form of a 90° elbow. It will be understood that the cylindrical portion 78 of the third body 20 may also have a generally axially extending, linear shape.

An end portion of the bore 84 at the first end 80 of the cylindrical portion 78 is sized to securely receive the first end of the second conduit 14. Suitable means may be employed to fixedly couple the second conduit 14 in the bore 84. By example only, the second conduit 14 is preferably solvent bonded in the bore 84 of the cylindrical portion 78.

A pair of latch arms 86 project axially from the second end 82 of the cylindrical portion 78. The latch arms 86 are diametrically opposed and have a generally concave shape to define a portion of an annular bore sized to securely receive the frusto-conical portion 53 of the second body 18. A receiver means 90, such as an aperture, is formed in each latch arm 86. An inwardly extending projection 92 is formed in each latch arm 86 adjacent one edge of the aperture 90. The projections 92 are positioned to snap around and engage the peripheral edge on the frusto-conical portion 53 on the second body 18 to releasably interconnect the second and third bodies 18 and 20. The latch arms 86 extend angularly inward with respect to the longitudinal axis of the tubular portion 78 of the third body 20 to increase spring force on the second body 18 so as to securely engage the projections 92 with the peripheral edge 56 on the second body 18 to provide increased pull out force resistance.

A pair of guide members 94 are disposed diametrically opposite each other and between the latch arms 86 and projects from the second end 82. The guide members 94 have a generally concave shape.

Means are provided for fixedly mounting the third body 20 and the first and second bodies 16 and 18 interconnected thereto to a support structure 100 as shown in FIG. 4. In an automotive application, the support structure 100 may be a vehicle cowl screen having an aperture 102 formed therein for receiving the tubular cylindrical portion 78 of the third body 20 therethrough. In this configuration, the second end 82 of the third body 20 may have a generally collar-like shape to seat against one side of the support structure 100.

At least one and preferably, a pair of resilient, outwardly extending latch members 88 are carried externally on the cylindrical portion 78 and are designed to resiliently fold into close proximity with the cylindrical portion 78 as the third body 20 is inserted through the aperture 102 in the support structure 100 and then snap outward into engagement with one surface of the support structure 100 to lockingly mount the third body 20 to the support structure 100.

The quick connector fluid coupling 10 described above and shown in FIGS. 1–4 finds advantageous use in an automotive windshield washer/wiper system. In this application, the second conduit 14 extending from the third body 20 may be connected to the washer fluid reservoir and pump in the vehicle engine compartment. This enables the pump, reservoir, conduit, and cowl screen to be manufactured as a single subassembly separate from the other vehicle components. The first conduit 12 is mounted on the vehicle wiper arm such that the joined first and second bodies 16 and 18 enable a snap-in connection with the third body 20 when the wiper arm is mounted on the vehicle. Thus, the wiper arm subassembly can be completed separate from the windshield washer fluid pump and reservoir subassembly.

The connection of the second and third bodies 18 and 20 is simple and ergonomic due to the relatively larger diameter size than the small diameter, flexible conduits and connectors employed in prior wiper/washer systems. Further, the snap-in engagement of the latch arms 86 on the third body 20 into engagement with the edge on the frusto-conical portion 53 of the second body 18 provides a positive indication to the installer of full, sealed engagement of the second and third bodies 18 and 20.

Figure 5:
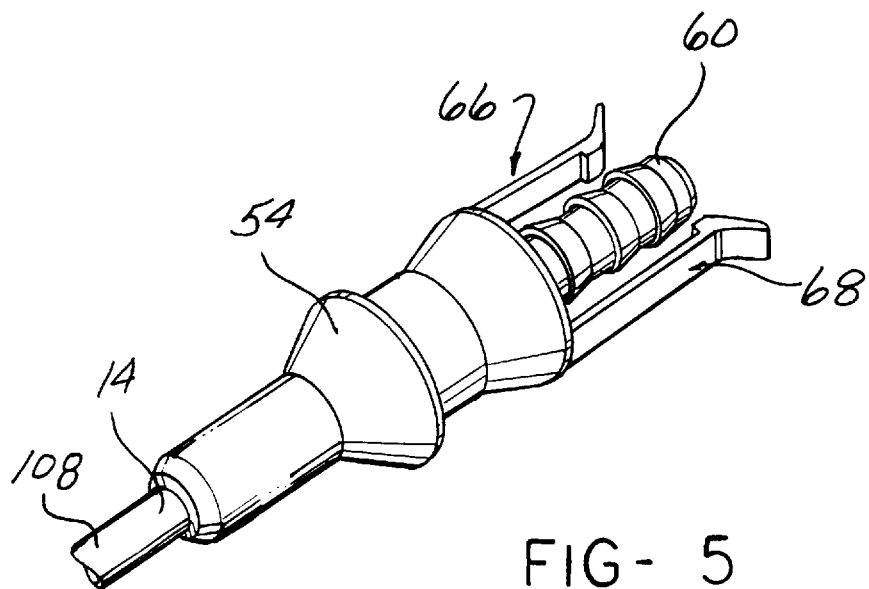
FIG. 5 is a perspective view of an alternate embodiment of the second body.

FIG. 5 depicts an alternate embodiment of the second body 18 which enables the first and second bodies 16 and 18 to be used together as a fluid coupler for interconnecting two conduits in fluid flow communication. In this embodiment, the second body 18 is substantially identical to the embodiment shown in FIGS. 1–5 and described above except that the annular recess 50 and seal O-ring 52 are eliminated and replaced by means for securely and sealingly mounting an external conduit or tube 108 to the tubular cylindrical portion 48 of the second body 18. The mounting may simply comprise suitably sizing the bore at the first end 44 of the tubular cylindrical portion 48 with an inner diameter to securely receive the conduit 108 therein, with the conduit 108 being fixedly joined thereto by means of solvent bonding. Alternately, and not shown, one or more radial projections or barbs, similar to the projections 62 on the extension 60 shown in FIG. 2, may be formed externally on the cylindrical portion 48 to mechanically retain the conduit 108 on the second body.

In summary, there has been disclosed a unique quick connector fluid coupling which is ideally suited for use in interconnecting a conduit connected to a vehicle windshield wiper arm and a separate conduit extending from the washer fluid supply reservoir to a connector mounted in the cowl screen of an automobile. The quick connector provides an easy, ergonomic connection thereby insuring that a complete, fully seated and sealed connection is made between the various connector components.

What is claimed is:

1. A fluid connector for joining first and second conduits comprising:

a first connector body having a through bore extending between opposed first and second ends, the bore receiving the first conduit through the second end of the first body;

the bore tapering in diameter from a large diameter end at the first end of the first body to a smaller diameter in the first body;

a second body having opposed first and second ends;

an extension extending from the second end of the second body, at least one radially extending projection formed on the extension;

a bore extending through the second body and the extension;

means, carried on the first and second bodies, for releasably interconnecting the first and second bodies;

the at least one projection and the tapering diameter bore in the first body forcibly deforming the first conduit therebetween to sealingly couple the first conduit to the second body;

a third body having a bore extending between first and second ends, the bore receiving the second conduit at one end; and means, carried on the second and third bodies, for releasably interconnecting the second and third bodies.

2. The fluid connector of claim 1 wherein:

the at least one radially extending projection on the extension comprises a plurality of axially spaced, annular projections.

3. The fluid connector of claim 1 wherein the means for interconnecting the first and second bodies comprises:

a pair of latch arms extending from the second end of the second body; and receiver means, carried in the first body, for releasably receiving the latch arms.

4. The fluid connector of claim 3 wherein the receiver means comprises:

a pair of discrete apertures formed in the first body; and a pair of guide recesses formed in the first body for aligning the latch arms with the pair of apertures.

5. The fluid connector of claim 3 wherein:

the first and second latch arms extend angularly inward from an end at the second end of the second body to an outer end spaced from the second end of the second body.

6. The fluid connector of claim 1 wherein the means for interconnecting the second and third bodies comprises:

an enlarged portion formed on the second body having a peripheral edge;

a pair of latch members extending from the third body; and a receiver carried in each latch member engagable with the peripheral edge of the enlarged portion on the second body to releasably interconnect the second and third bodies.

7. The fluid connector of claim 6 further comprising:

means for mounting the third body to a support.

8. The fluid connector of claim 7 wherein the mounting means comprises:

a pair of arms resiliently extending from the third body;

the arms releasably engageable with the surface after the arms on the third body are inserted through an aperture in the support surface.

9. A fluid connector for joining first and second conduits comprising:

a first connector body having a through bore extending between opposed first and second ends the bore receiving the first conduit;

the bore tapering in diameter from a large diameter end at the first end of the first body to a smaller diameter in the first body;

a second body having opposed first and second ends;

an extension extending from the second end of the second body, at least one radially extending projection formed on the extension;

a bore extending through the second body and the extension;

means, carried on the first and second bodies, for releasably interconnecting the first and second bodies;

the at least one projection and the tapering diameter bore in the first body forcibly deforming the first conduit therebetween to sealingly couple the first conduit to the second body;

a third body having a bore extending between first and second ends, the bore receiving the second conduit at one end; and means, carried on the second and third bodies, for releasably interconnecting the second and third bodies.

10. The fluid connector of claim 9 wherein:

the at least one radially extending projection on the extension comprises a plurality of axially spaced, annular projections.

11. The fluid connector of claim 9 wherein the means for interconnecting the first and second bodies comprises:

a pair of latch arms extending from the second end of the second body; and receiver means, carried in the first body, for releasably receiving the latch arms.

12. The fluid connector of claim 11 wherein the receiver means comprises:

a pair of discrete apertures formed in the first body; and a pair of guide recesses formed in the first body for aligning the latch arms with the pair of apertures.

13. The fluid connector of claim 11 wherein:

the first and second latch arms extend angularly inward from an end at the second end of the second body to an outer end spaced from the second end of the second body.

* * * * *